US008955758B2

(12) United States Patent
Thill et al.

(10) Patent No.: US 8,955,758 B2
(45) Date of Patent: Feb. 17, 2015

(54) SMARTCARD PROVIDING AN IMPROVED STANDBY MODE

(75) Inventors: Michel Thill, Meudon (FR); François-Xavier Marseille, Meudon (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/993,072

(22) PCT Filed: Nov. 29, 2011

(86) PCT No.: PCT/EP2011/071302
§ 371 (c)(1),
(2), (4) Date: Aug. 22, 2013

(87) PCT Pub. No.: WO2012/076369
PCT Pub. Date: Jun. 14, 2012

(65) Prior Publication Data
US 2013/0334320 A1  Dec. 19, 2013

(30) Foreign Application Priority Data
Dec. 10, 2010 (EP) .................... 10306393

(51) Int. Cl.
G06K 19/06 (2006.01)
G06K 19/073 (2006.01)
G06K 19/07 (2006.01)

(52) U.S. Cl.
CPC .............. *G06K 19/073* (2013.01); *G06K 19/07* (2013.01)
USPC ............................ 235/492; 235/380; 235/487

(58) Field of Classification Search
CPC . G06K 19/0702; G06K 19/07; G06K 19/077; G06K 19/073; G07C 13/00
USPC .......... 235/492, 380, 375, 487, 451; 713/172, 713/186, 300–324, 340
See application file for complete search history.

(56) References Cited

U.S. PATENT DOCUMENTS

| | | | |
|---|---|---|---|
| 2006/0187734 A1* | 8/2006 | Takazawa et al. | 365/229 |
| 2007/0145133 A1* | 6/2007 | Jolivet | 235/441 |
| 2008/0006704 A1* | 1/2008 | Kim | 235/492 |

(Continued)

FOREIGN PATENT DOCUMENTS

WO   WO2010060367 A1   6/2010

OTHER PUBLICATIONS

PCT/EP2011/071302 International Search Report, European Patent Office, P.B. 5818 Patentlaan 2 NL—2280 HV Rijswijk, Dec. 20, 2011.

*Primary Examiner* — Edwyn Labaze
(74) *Attorney, Agent, or Firm* — The Jansson Firm; Pehr B. Jansson

(57) ABSTRACT

The invention relates to a smartcard (10) comprising: —a microcontroller (30); —a contact communication interface (11); —a supply line (Vcc) connecting the contact communication interface to the microcontroller, a clock line (Clk) connecting the contact communication interface to the microcontroller. The smartcard further comprises a power management circuit (20) including a switch (23) adapted to selectively open or close the supply line connection between the contact communication interface and the microcontroller, the power management circuit being adapted to detect the loss of a clock signal on the clock line (Clk), adapted to keep said switch closed during a predetermined period after a loss of clock signal is detected and adapted to open said switch after said predetermined period.

11 Claims, 2 Drawing Sheets

(56) References Cited

U.S. PATENT DOCUMENTS

2009/0013125 A1* 1/2009 Mizushima et al. .......... 711/103
2009/0236416 A1* 9/2009 Morita .......................... 235/380
2010/0103995 A1 4/2010 Seo et al.
2011/0022797 A1* 1/2011 Hoeksel et al. ............... 711/115
2012/0024961 A1* 2/2012 Yisraelian et al. ............ 235/492
2012/0234927 A1* 9/2012 Poidomani et al. ........... 235/492

* cited by examiner

SMARTCARD PROVIDING AN IMPROVED STANDBY MODE

BACKGROUND

The present invention generally relates to low power devices and more particularly to low power devices performing transactions with smartcards.

Smart cards are plastic cards having an embedded smartcard chip. A smartcard chip is an integrated microcontroller generally comprising a central processing unit, a random access memory, a ROM memory and an EEPROM memory. The smartcard is provided with a contact communication interface. Such a smartcard can carry out a transaction through its contact interface when it is hosted in a smartcard reader. Smart cards are widely used to store sensitive information such as cryptographic keys or software routines that implement valuable algorithms or know-how. Smartcards are notably used for authentication purposes in relation with communication modems.

An increasing number of communication modems are used in environments where their power supply is limited. The use of such modems is notably known for a communication between an energy provider and the consumption counter located at the home of a final user. Such modems can notably be linked to a sensor measuring the electric power consumption, a gas flow or a water flow. On a regular basis, the modem sends the amount measured by the sensor to the energy provider.

Such a modem can be led to work during a significant time or permanently without any external power supply. The modem may notably be left months or years without any external intervention. The operation of such a modem then relies on a battery power supply. If the battery is not charged frequently enough or if it is not timely replaced, the modem may have to power itself off. The modem is then unable to communicate with remote premises. To delay the necessity to proceed to a power off, modems and smartcards need to be provided with efficient low consuming modes.

As the remote communications of the modem are timely spaced (for instance several minutes, hours or days), the modem and the smartcard remain idle most of the time. To benefit from the idle periods, such a modem can be provided with a low power mode. Its static power consumption is thereby reduced during the idle periods in order to increase its autonomy.

When the modem enters in low power mode, it performs a standby process. During the standby process, the modem stops sending APDUs to the smartcard. The smartcard then enters in standby mode. The modem then stops the clock sent to the smartcard. The smartcard then switches from the standby mode to a clock stop mode.

The clock stop mode is the mode where the smartcard has the lowest consumption. Most of the power consumption in clock stop mode is due to leakage currents. Unfortunately, security requirements induce a significant leakage current in conventional smartcards. The smartcards providing the lowest clock stop mode consumption still face a leakage current superior to 50 Microamperes. Thus, even if very efficient modems are used (for instance providing a leakage current as low as several hundreds of nanoamperes), the modem will have to power the smartcard which has a significantly higher power consumption. The smartcard in clock stop mode thus seriously reduces the modem autonomy. The modem and smartcard can thus reveal inappropriate for many applications due to their low autonomy.

An alternative could be to suppress the smartcard power supply when entering into low power mode. In this case when the modem switches back to active mode, the smartcard is powered up. During its start, the smartcard has to load applications and has to communicate with the modem, for instance to send an ATR (Answer to Reset) to modem or to define a PPS (Protocol and Parameter Select) value for the future communications. This solution has two drawbacks:

This protocol is not compliant with ETSI standard, and requires software modifications of the modem.

Starting the smartcard is a quite lengthy process. Each modem remote communication would be delayed by this starting process.

SUMMARY

Thus, there is a need for a smartcard solving one or more of these drawbacks. The invention proposes a smartcard comprising:

a microcontroller;
a contact communication interface;
a supply line connecting the contact communication interface to the microcontroller, a clock line connecting the contact communication interface to the microcontroller.

The smartcard further comprises a power management circuit including a switch adapted to selectively open or close the supply line connection between the contact communication interface and the microcontroller, the power management circuit being adapted to detect the loss of a clock signal on the clock line, adapted to keep said switch closed during a predetermined period after a loss of clock signal is detected and adapted to open said switch after said predetermined period.

According to an embodiment, said power management circuit is adapted to detect the clock signal restoration and is adapted to close said switch after a clock signal restoration is detected.

According to another embodiment, said microcontroller comprises a non volatile memory, said microcontroller being adapted to detect the loss of a clock signal on the clock line and to adapt to save its execution context in the non volatile memory when a loss of clock signal is detected.

According to a further embodiment, said contact interface complies with ISO 7816 standards requirements.

According to another embodiment, the saved execution context includes the PPS value of the transaction performed when the loss of clock signal is detected.

According to a further embodiment, said microcontroller is adapted to check that no reset signal is received when it is powered up, to restore the execution context when no reset signal is detected and to resume its execution based on the execution context.

According to an embodiment, the ATR transmission is managed by software executed by the microcontroller, said microcontroller is adapted to check that no reset signal is received when it is powered up and adapted to block the ATR transmission when no reset signal is detected.

According to a further embodiment, wherein the microcontroller and the power management circuit are formed on distinct semiconductor substrates, the power management circuit providing a leakage current at least 20 times lower than the microcontroller.

Alternatively, the microcontroller and the power management circuit can be formed on a single semiconductor chip.

The invention further relates to a method for switching a smartcard into standby mode, comprising the steps of:

detecting the loss of a clock signal on a clock line connecting a contact interface and a microcontroller of the smartcard;

maintaining a connection between said contact interface and said microcontroller through a power supply line during a predetermined period after the loss of clock signal has been detected;

opening the power supply line connection after said predetermined period.

According to an embodiment, the microcontroller comprises a non volatile memory, the microcontroller detecting the loss of the clock signal and saving its execution context in the non volatile memory during said predetermined period.

BRIEF DESCRIPTION OF THE DRAWINGS

The advantage of the present invention will become apparent from the following description of several embodiments with reference to the accompanying drawings, in which.

DETAILED DESCRIPTION

Figure 1:
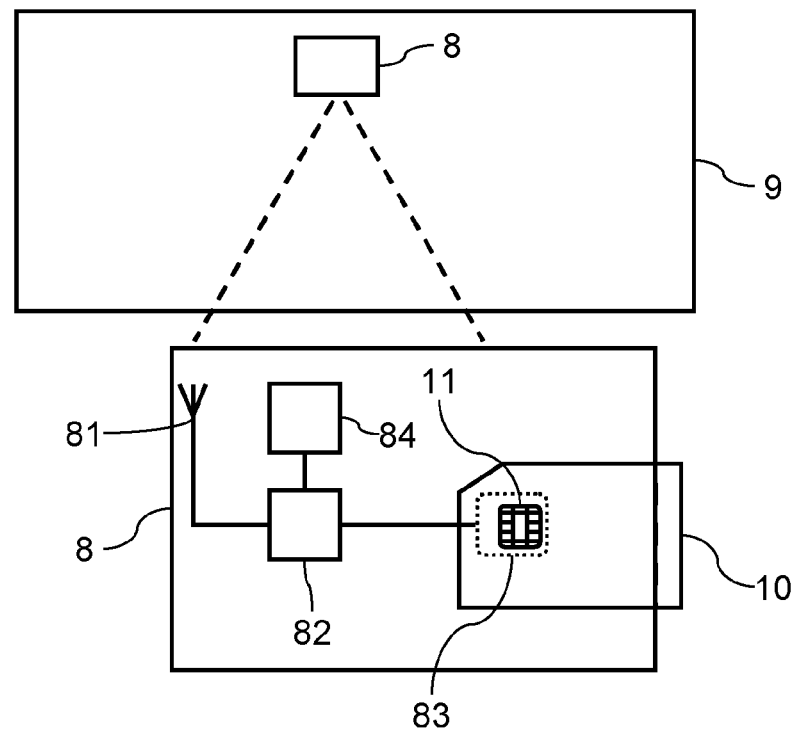
FIG. 1 is a schematic view of a mobile support to which a modem is fastened.

FIG. 1 is a schematic view of a mobile support 9, such as a transport container. A modem 8 is fastened to the support 9 and is designed to communicate remotely. Such a support 9 is intended to be transported using either ships or trucks and can be stored during several days on warehouse spaces. During its use, the support 9 may be located at places where no external power supply is available for its modem 8. The modem 8 may comprise a Global Positioning System in order to regularly send its location to a remote server.

The modem 8 comprises a microcontroller 82, a contactless communication interface 81, a contact communication interface 83 and a battery 84. The microcontroller 82 manages the contactless communication interface 81 and the contact communication interface 83. The contact communication interface 83 is located in a smartcard reception slot, for instance at a SIM format. A smartcard 10 is inserted in the reception slot and comprises a contact communication interface connected to the contact communication interface 83 of the modem 8. The microcontroller 82 can perform a transaction with smartcard 10 to have data ciphered or to proceed to an authentication to obtain an access to a contactless communication network, such as a mobile phone communication network reachable through the contactless communication interface 81.

As known by someone skilled in the art, the modem 8 may have three smartcard management modes: an active mode where it performs a transaction with the smartcard, an inactive mode where it does not perform a transaction with the smartcard but provides the smartcard with a clock signal, and a low power mode where it stops providing the clock signal to the smartcard.

The modem 8 also comprises an interface for receiving an external power supply (not illustrated). Depending on the availability of an external power supply, the modem 8 is either powered by the external power supply or by the battery 84.

Each time the modem 8 is idle and intends to enter low power mode, it triggers a standby process to reduce the discharge of the battery 84.

The invention proposes a smartcard structure for lowering its power consumption and for speeding up its availability for resuming the previous settings when the modem 8 has switched to low power mode.

Figure 2:
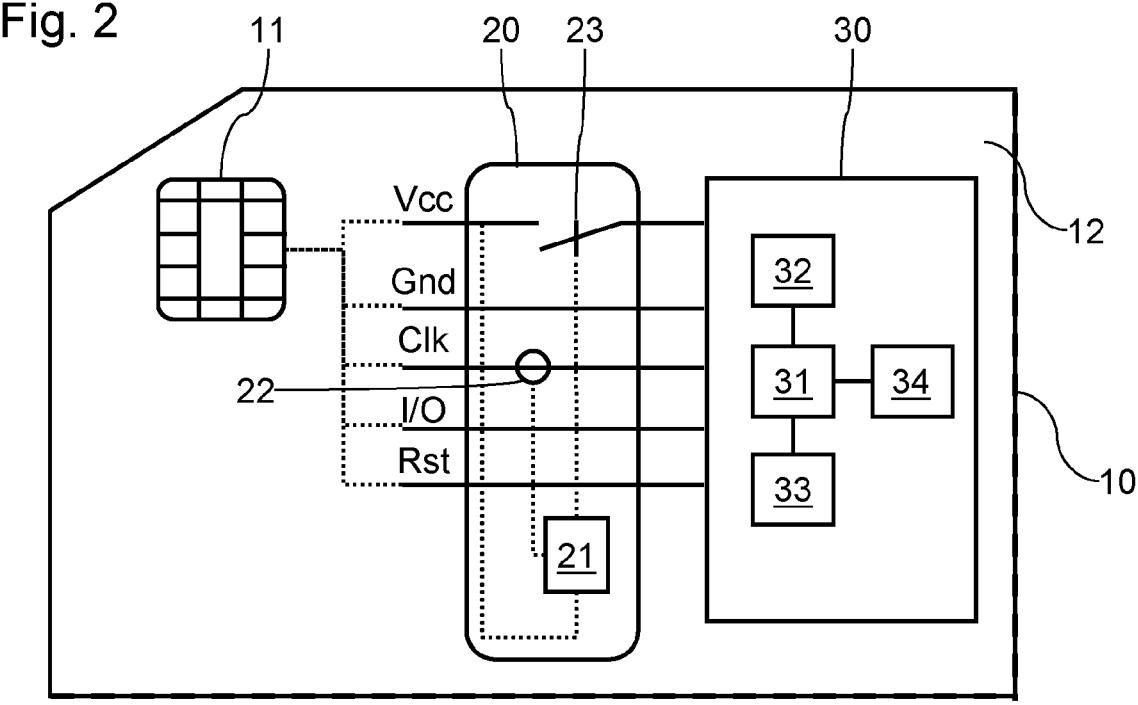
FIG. 2 is a schematic view of a smartcard according to an embodiment of the invention.

FIG. 2 is a schematic view of the structure of a smartcard 10 according to an embodiment of the invention. The smartcard 10 includes a plastic card 12 embedding a smartcard chip 30. The smartcard chip 30 is an integrated microcontroller comprising a central processing unit 31, a random access memory 32, a ROM memory 33 and a non volatile memory 34. The ROM memory 33 may notably store an operating system that is loaded by the central processing unit 31 at startup. The non volatile memory 34, such as an EEPROM memory, may store various working parameters of the microcontroller 30. The smartcard 10 is adapted to store sensitive information such as cryptographic keys or software routines, in order to perform ciphering or authentication processes. The microcontroller 30 may have a standby mode as known from the prior art. When it detects that no transaction has been performed with the modem 8 during a predetermined period, it switches into standby mode where its power consumption is reduced. In this standby mode, the microcontroller 30 remains powered.

The smartcard 10 is also provided with a contact interface 11. The contact interface 11 is for instance compliant with the ISO 7816 standard requirements. The contact communication interface 11 provides surface connectors for receiving the following signals from the contact communication interface 83. Corresponding connection lines connect the interface 11 to the microcontroller 30:

a Vcc line receives a power supply signal from interface 83;

a Gnd line is connected to the ground of the modem 8;

a Clk line receives a clock signal from interface 83;

an I/O line receives an input signal from interface 83 and sends an Output signal to interface 83;

an Rst line receives a reset signal from interface 83.

The smartcard 10 further comprises a power management circuit 20. This power management circuit 20 is interconnected between the interface 11 and the microcontroller 30. The power management circuit 20 comprises a switch 23 adapted to selectively open or close the supply line connection between the interface 11 and the microcontroller 30. The switch 23 can thereby selectively interrupt the power supply provided to the microcontroller 30. The power management circuit 20 further comprises a clock signal detector 22. The power management circuit 20 further comprises a control circuit 21. The control circuit 21 is connected to the supply line upstream of the switch 23, in order to keep a power supply even when the switch 23 is open. The control circuit 21 is also connected to the detector 22. The detector 22 is adapted to detect a loss of clock signal on the Clk line. The detector 22 informs the control circuit 21 in case a loss of clock signal is detected on the clock signal line. If the microcontroller 30 is in standby mode at the time the loss of the clock signal is detected, the microcontroller 30 is activated to manage its switching into a clock-stop mode. The power management circuit 20 is used to lower the smartcard power consumption in comparison to the standby mode, when the modem 8 enters into low power mode.

The smartcard 10 can be automatically switched into clock stop mode by the modem 8. When modem 8 switches into low power mode, it stops sending the clock signal to the communication interface 83, while maintaining the power supply on this communication interface 83.

The loss of clock signal is detected by the power management circuit 20. The power management circuit 20 keeps the switch 23 closed during a predetermined period after a loss of clock signal has been detected. The power management circuit 20 may include a timer that triggers the opening of switch 23 at its expiry. The timer may be set to maintain the switch 23 closed during several hundreds of clock cycles of the smartcard 10.

In the clock stop mode of the smartcard 10, the switch 23 is open. The microcontroller 30 has thus no power consumption in this clock stop mode. The clock stop mode is thus an improved standby mode. Since the overall power consumption is reduced by the use of such a clock stop mode, there are no requirements to change the microcontroller 30 design technology to reduce its power consumption. Already available microcontroller technologies can be used in a smartcard 10 according to the invention, while providing satisfactory levels of consumption reduction in clock stop mode.

Figure 3:
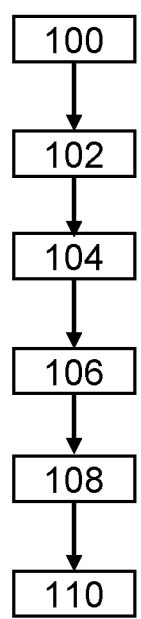
FIG. 3 is a logical diagram illustrating the process performed during a smartcard switch into clock stop mode.

FIG. 3 is a logical diagram illustrating the switching of the smartcard 10 into a clock stop mode in case the modem 8 has no transaction to perform with the smartcard 10.

At step 100, the modem 8 determines that a low power mode switching condition is met, for instance because it shall remain idled for a long period and because no immediate transaction has to be carried out with the smartcard 10.

At step 102, the modem 8 stops sending the clock signal to the smartcard 10.

At step 104, the power management circuit 20 detects the loss of the clock signal. The power management circuit 20 triggers a standby timer. The microcontroller 30 also detects the loss of the clock signal. The microcontroller 30 thus determines that a switch into clock-stop mode is currently performed. The microcontroller 30 uses its own clock signal up to the opening of the switch 23.

At step 106, the microcontroller 30 saves its current execution context into its non volatile memory 34.

At step 108, the microcontroller 30 ends the saving of its execution context before the end of the standby timer of the power management circuit 20.

At step 110, the standby timer expires. The power management circuit 20 opens the switch 23. The microcontroller 30 is not powered anymore. The smartcard 10 is thus maintained into a very low power consumption mode. The modem 8 still applies a power supply on the communication interface 11, thus providing a power supply to the power management circuit 20.

If the smartcard 10 is kept in clock stop mode further to the modem 8 not requiring its use, its power consumption is limited to the power supply of the power management circuit 20. Such a management circuit 20 can have a very simple design. It is currently possible to design such a management circuit 20 using 0.18 μm etching technologies, which would lead to a power consumption of several tens of nA. The microcontroller 30 and the power management circuit 20 are advantageously formed on distinct semiconductor substrates, the power management circuit 20 providing a leakage current significantly lower than the microcontroller 30.

Figure 4:
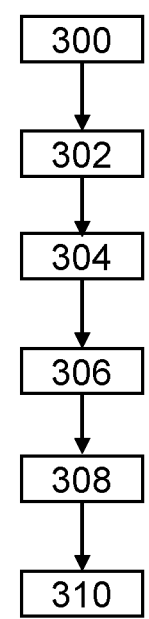
FIG. 4 is a logical diagram illustrating the process performed during a smartcard switch into active mode.

FIG. 4 is a logical diagram illustrating the switching of the smartcard 10 exiting the clock stop mode by switching into its active mode.

At step 300, the modem 8 determines that an active mode switching condition is met, for instance because a transaction has to be carried out with the smartcard 10. The modem 8 thus switches from the low power mode to the active mode. During this mode switching, no reset signal is sent to the smartcard since the smartcard processing is fully transparent for the modem 8: the modem 8. does not know the new state introduced by power management circuit.

At step 302, the modem 8 restores the emission of the clock signal to the smartcard 10. The modem 8 triggers a power up timer. Such a power up timer is already defined in ISO 7816 standards for a smartcard reset and amounts 400 clock cycles.

At step 304, the power management circuit 20 is still provided with a power supply and detects the restoration of the clock signal. The power management circuit 20 closes the switch 23 further to this clock signal detection. The microcontroller 30 is thus powered up.

At step 306, the microcontroller 30 determines that it is powered up further to a clock stop mode, since the modem 8 has not sent a reset signal. The microcontroller 30 loads the execution context from the non volatile memory 34 to resume its execution. Further to a standby detection, the microcontroller 30 also blocks the emission of an ATR (Answer To Reset) to the modem 8. The ATR message is supposed to be sent to a smartcard reader at each reset, according to requirements of the ISO 7816 standards. The modem 8 thereby determines that the microcontroller was successfully switched into clock stop mode and that its execution is about to be resumed with the former execution context. Since the microcontroller 30 determines that it is resuming its execution, the microcontroller 30 advantageously blocks the negotiation of the PPS value in order to have the next transaction between the smartcard 10 and the modem 8 carried out with the previous PPS parameters. The microcontroller 30 starts the execution of its applications.

At step 308, the power up timer of the modem 8 expires. The modem 8 then sends its first transaction request to the smartcard 10.

At step 310, the microcontroller handles the first transaction request and resumes the execution of its applications based on the loaded execution context.

The saved execution context may comprise the content of various memory registers of the RAM 32, of various RAM areas used by the applications run by the microcontroller 30, the content of transitory values stored in the RAM, the identification of the ciphering keys in use, the identification of the applications whose execution is called . . .

The microcontroller 30 uses a software ATR management. With a software ATR management, the microcontroller 30 may easily block the emission of an ATR message when it is powered up if no reset is detected. Software ATR management is often performed by smartcards managing multiple contact interfaces. For instance, smartcard chips may provide a SWP (for Single Wire Protocol) or a USB interface. Such a smartcard may switch between an ISO communication mode and a non-ISO communication mode (USB protocol for instance).

The invention can advantageously be embodied without any impact on the ISO 7816 compliance. For instance, a standard power up timer can be used by the smartcard reader before it sends its first request to the smartcard 10. The only signal triggering the switch into the clock stop mode/from the clock stop mode is the disappearance/restoration of the clock signal on the contact interface 11, which is commonly managed by smartcard readers providing a low power mode. The device (the modem 8 in the example) receiving the smartcard 10 may thus be kept unchanged, its standard switching into low power mode being sufficient to trigger the clock stop mode of the smartcard 10.

The invention claimed is:
1. A smart card comprising:
a microcontroller;
a contact communication interface;

a power supply line connecting the contact communication interface to the microcontroller;

a clock line connecting the contact communication interface to the microcontroller;

a power management circuit including a switch adapted to selectively open or close the power supply line connection between the contact communication interface and the microcontroller, the power management circuit being adapted to detect the loss of a clock signal on the clock line, adapted to keep said switch closed during a predetermined period after a loss of clock signal is detected and adapted to open said switch after said predetermined period.

2. The smart card (10) according to claim 1, wherein said power management circuit (20) is adapted to detect the clock signal restoration and is adapted to close said switch after a clock signal restoration is detected.

3. The smart card (10) according to claim 1, wherein said microcontroller (30) comprises a non volatile memory, said microcontroller being adapted to detect the loss of a clock signal on the clock line and to adapted to save its execution context in the non volatile memory when a loss of clock signal is detected.

4. The smart card according to claim 3, wherein said contact interface (11) complies with ISO 7816 standards requirements.

5. The smart card according to claim 3 or 4, wherein the saved execution context includes a Protocol and Parameter Select (PPS) value of the transaction performed when the loss of clock signal is detected.

6. The smart card according to claim 4, wherein said microcontroller is adapted to check that no reset signal is received when it is powered up, to restore the execution context when no reset signal is detected and to resume its execution based on the execution context.

7. The smart card according to claim 4, wherein an Answer to Reset (ATR) transmission is managed by software executed by the microcontroller, wherein said microcontroller is adapted to check that no reset signal is received when it is powered up and adapted to block the ATR transmission when no reset signal is detected.

8. The smart card according to claim 1, wherein the microcontroller and the power management circuit are formed on distinct semiconductor substrates, the power management circuit providing a leakage current at least 20 times lower than the microcontroller.

9. The smart card according to claim 1, wherein the microcontroller and the power management circuit are formed on a single semiconductor chip.

10. A method for switching a smartcard into standby mode, comprising the steps of:

detecting the loss of a clock signal on a clock line connecting a contact interface and a microcontroller of the smartcard;

maintaining a connection between said contact interface and said microcontroller through a power supply line during a predetermined period after the loss of clock signal has been detected;

opening the power supply line connection after said predetermined period.

11. The method according to claim 10, wherein the microcontroller comprises a non volatile memory, the microcontroller detecting the loss of the clock signal and saving its execution context in the non volatile memory during said predetermined period.

* * * * *